(12) United States Patent
Rajan et al.

(10) Patent No.: US 7,383,378 B1
(45) Date of Patent: Jun. 3, 2008

(54) SYSTEM AND METHOD FOR SUPPORTING FILE AND BLOCK ACCESS TO STORAGE OBJECT ON A STORAGE APPLIANCE

(75) Inventors: Vijayan Rajan, Sunnyvale, CA (US); David Brittain Bolen, Durham, NC (US)

(73) Assignee: Network Appliance, Inc., Sunnyvale, CA (US)

( * ) Notice: Subject to any disclaimer, the term of this patent is extended or adjusted under 35 U.S.C. 154(b) by 1023 days.

(21) Appl. No.: 10/412,051

(22) Filed: Apr. 11, 2003

(51) Int. Cl.
*G06F 12/00* (2006.01)
*G06F 13/00* (2006.01)
*G06F 13/28* (2006.01)

(52) U.S. Cl. ............... 711/112; 707/205; 709/213
(58) Field of Classification Search ........... 711/112; 707/205
See application file for complete search history.

(56) References Cited

U.S. PATENT DOCUMENTS

| | | | |
|---|---|---|---|
| 5,163,131 A | 11/1992 | Row et al. | |
| 5,355,453 A | 10/1994 | Row et al. | |
| 5,485,579 A | 1/1996 | Hitz et al. | |
| 5,802,366 A | 9/1998 | Row et al. | |
| 5,819,292 A | 10/1998 | Hitz et al. | |
| 5,931,918 A | 8/1999 | Row et al. | |
| 5,941,972 A | 8/1999 | Hoese et al. | |
| 5,948,110 A | 9/1999 | Hitz et al. | |
| 5,950,225 A | 9/1999 | Kleiman | |
| 5,963,962 A | 10/1999 | Hitz et al. | |
| 6,038,570 A | 3/2000 | Hitz et al. | |
| 6,065,037 A | 5/2000 | Hitz et al. | |
| 6,138,126 A | 10/2000 | Hitz et al. | |
| 6,289,356 B1 | 9/2001 | Hitz et al. | |
| 6,425,035 B2 | 7/2002 | Hoese et al. | |
| 2002/0112022 A1 | 8/2002 | Kazar et al. | |
| 2002/0116593 A1 | 8/2002 | Kazar et al. | |
| 2004/0030822 A1* | 2/2004 | Rajan et al. | 711/4 |
| 2004/0233910 A1* | 11/2004 | Chen et al. | 370/395.5 |

OTHER PUBLICATIONS

Maintenance Procedures ND (8C) nd-network disk control Feb. 1985.
Misc. Reference Manual Pages ND (4P) nd-network disk driver Jul. 26, 1985.
Asante EN/SC Adapter Family Installation Guide May 1994.
Asante Desktop EN/SC Adapters User's Manual Apr. 1996.

(Continued)

*Primary Examiner*—Matt Kim
*Assistant Examiner*—Edward J Dudek
(74) *Attorney, Agent, or Firm*—Cesari and McKenna, LLP

(57) ABSTRACT

A technique enables application data stored on storage devices of a storage system to be accessible by a client as either a file or logical unit number (lun). The storage system is illustratively embodied as a multi-protocol storage appliance having a storage operating system that implements a file system. The file system logically organizes the application data as a virtual disk (vdisk) comprising a plurality of inodes including a prefix stream inode, a lun inode (storing the application data) and a suffix stream inode. The prefix and suffix stream inodes allow the vdisk to be shared over a block-based protocol or a file-based protocol by enabling apportionment of client operating system dependent storage device contents from application data contents of the vdisk.

10 Claims, 11 Drawing Sheets

OTHER PUBLICATIONS

Performance Without Compromise: The Virtual Storage Architecture 1997.

Anthony J. McGregor Department of Computer Science, University of Waikato Dissertation: Block-Based Distributed File Systems Jul. 1997.

U.S. Appl. No. 10/216,453, Vijayan Rajan et al.

U.S. Appl. No. 10/215,917, Brian Pawlowski et al.

David Hitz et al. TR3002 File System Design for a NFS File Server Appliance published by Network Appliance, Inc.

Common Internet File System {CIFS} Version: CIFS-Spec 0.9, Storage Networking Industry Association (SNIA), Draft SNIA CIFS Documentation Work Group Work-in-Progress, Revision Date: Mar. 26, 2001.

Fielding et al. (1999) Request for Comments (RFC) 2616, HTTP/1.1.

* cited by examiner

| SUBTYPE ATTRIBUTE 802 | SIZE 804 |
|---|---|
| IMAG | PREFIX = 0<br>SUFFIX = 0 |
| SOLARIS | PREFIX = 1 CYLINDER<br>SUFFIX = 2 CYLINDERS |
| WINDOWS | PREFIX = 1 TRACK<br>SUFFIX = 0 |
| VLD | PREFIX = - 64 KB<br>SUFFIX = 0 |

FIG. 8

SYSTEM AND METHOD FOR SUPPORTING FILE AND BLOCK ACCESS TO STORAGE OBJECT ON A STORAGE APPLIANCE

FIELD OF THE INVENTION

The present invention relates to network storage systems and, more particularly, to accessing information stored on networked storage systems.

BACKGROUND OF THE INVENTION

A storage system is a computer that provides storage service relating to the organization of information on writable persistent storage devices, such as memories, tapes or disks. The storage system may be deployed within a storage area network (SAN) or a network attached storage (NAS) environment. When used within a NAS environment, the storage system may be embodied as a file server including an operating system that implements a file system to logically organize the information as a hierarchical structure of directories and files on, e.g., the disks. Each "on-disk" file may be implemented as a set of data structures, e.g., disk blocks, configured to store information, such as the actual data for the file. A directory, on the other hand, may be implemented as a specially formatted file in which information about other files and directories are stored.

The file server, or filer, may be further configured to operate according to a client/server model of information delivery to thereby allow many client systems (clients) to access shared resources, such as files, stored on the filer. Sharing of files is a hallmark of a NAS system, which is enabled because of semantic level of access to files and file systems. Storage of information on a NAS system is typically deployed over a computer network comprising a geographically distributed collection of interconnected communication links, such as Ethernet, that allow clients to remotely access the information (files) on the filer. The clients typically communicate with the filer by exchanging discrete frames or packets of data according to pre-defined protocols, such as the Transmission Control Protocol/Internet Protocol (TCP/IP).

In the client/server model, the client may comprise an application executing on a computer that "connects" to the filer over a computer network, such as a point-to-point link, shared local area network, wide area network or virtual private network implemented over a public network, such as the Internet. An example of an application running on a client is the Microsoft® Exchange application available from Microsoft Corporation, Redmond, Wash. Microsoft Exchange is a messaging and collaboration software product that provides a variety of applications for group interaction using networked computer systems. An Exchange application can run on a variety of operating systems including, for example, the Microsoft Windows® NT™ or Microsoft Windows 2000 operating system. A known file system designed for use with the NT or Windows 2000 operating system is the NT file system (NTFS).

In general, NAS systems utilize file-based protocols to access data stored on the filer. Each NAS client may therefore request the services of the filer by issuing file system protocol messages (in the form of packets) to the file system over the network. By supporting a plurality of file system protocols, such as the conventional Common Internet File System (CIFS), the Network File System (NFS) and the Direct Access File System (DAFS) protocols, the utility of the filer may be enhanced for networking clients.

A SAN is a high-speed network that enables establishment of direct connections between a storage system, such as an application server, and its storage devices. The SAN may thus be viewed as an extension to a storage bus and, as such, an operating system of the storage system enables access to stored information using block-based access protocols over the "extended bus". In this context, the extended bus is typically embodied as Fibre Channel (FC) or Ethernet media (i.e., network) adapted to operate with block access protocols, such as Small Computer Systems Interface (SCSI) protocol encapsulation over FC (FCP) or TCP/IP/Ethernet (iSCSI).

SCSI is a peripheral input/output (I/O) interface with a standard, device independent protocol that allows different peripheral storage devices, such as disks, to attach to the storage system. These storage devices may be locally attached to the storage system or, in the case of a SAN environment, attached via a network. In SCSI terminology, clients operating in a SAN environment are initiators that initiate requests and commands for data stored on the storage devices. The storage system is a target configured to respond to the requests issued by the initiators in accordance with a request/response protocol. The SAN clients typically identify and address the stored information in the form of blocks or disks by logical unit numbers ("luns").

There are differences in the interpretation of data that is exchanged between a client and storage system using block access protocols compared to file access protocols. A block access protocol, such as the SCSI protocol, "assumes" that the storage device is composed of a sequence of blocks, each containing either data or available space for storing data. Requests for retrieving (reading) or storing (writing) data include references for block numbers and data lengths. As a result, an application issuing a SCSI request (i.e., a SCSI requestor or initiator) must have knowledge of the metadata "disk semantic" mapping between the desired application data and the physical location of that data on the storage device. These disk semantics, which include SCSI geometry information pertaining to partitioning of the disk(s) storing the application data, are operating system specific and may be organized as either a partition table (for a Windows client) or a label (for a Solaris™/Unix® client).

In contrast, file access protocols assume that the server (filer) has a file system on which application data is stored. The file system generally refers to structuring of data and metadata on storage devices, such as disks, which permits reading/writing of data on those disks. The file system also includes mechanisms for performing these operations. While different file access protocols provide different semantics, each protocol fundamentally provides access to file system constructs, such as directories and files. The filer is responsible for mapping the files to its storage system.

Nevertheless, it may be desirable for a client application to access data (such as a file) on a storage system as a lun using a block access protocol. Examples of such data include a virtual logical disk (VLD), application file data and a database. Broadly stated, the VLD comprises NTFS file system and Exchange application data organized as a "container". The container is stored as a file on a file system and is "understandable" by a VLD disk driver constructed on a Windows 2000 client. The VLD driver functions as a translator that simulates a disk on the client by translating SCSI requests on the client into NFS requests to access the file (container) on a server, such as a filer. Simulation is performed using a 64 kilobyte (KB) header affixed to the file that contains access control information, along with information regarding properties of a disk storing the VLD file.

DDAFS is a disk driver constructed on a Solaris client that simulates a disk to the client, but that performs input/output operations using the DAFS protocol when accessing data stored as a file on the filer. Whereas the VLD file has a 64 k header, the DDAFS implementation of disk driver simulation comprises solely application data contents of the file. Simulations involving partition tables are then performed on the Solaris client. In contrast, a database, such as an Oracle® database, generally operates as a "raw" disk. From a Windows or Solaris client perspective, a raw disk is a disk that has a label, but no formatted partitions within the disk. For an application to access the database as a file, the label is eliminated because the disk semantics have no meaning within a "file view" of the data.

Notably, with respect to the client, the application data is the desired content of these files. All of the semantic information needed for the disk driver layer support resides "outside" of the application data. In other words, the application data is a contiguous section of data having similar format and usability, but surrounded by different semantics. In the VLD case, the semantics are embodied within a 64 k header, whereas for a raw disk, the application data is contained in a single large partition with a prepended partition table. In the DDAFS case, the application data is embodied as a single file with no headers, but which has a prepended label for the Solaris client.

Therefore, it is desirable to access a VLD or DDAFS file over block-based (SAN) protocols, such as FCP and iSCSI. In addition, it is desirable to access a database as either a file over file-based (NAS) protocols or as a lun over SAN protocols. The present invention is directed to a technique that enables a client to access application data as a lun, a file or other type of storage entity.

SUMMARY OF THE INVENTION

The present invention overcomes the disadvantages of the prior art by providing a technique that enables application data stored on storage devices of a storage system to be accessible by a client as either a file or logical unit number (lun). The storage system is illustratively embodied as a multi-protocol storage appliance having a storage operating system that implements a file system. The file system logically organizes the application data as a virtual disk (vdisk) storage object comprising a plurality of inodes including a prefix stream inode, a lun (application data container) inode and a suffix stream inode. The prefix and suffix stream inodes allow the vdisk to be shared over a block-based (SAN) protocol or a file-based (NAS) protocol by enabling apportionment of client operating system dependent storage device contents from application data contents of the vdisk.

In one embodiment of the invention, a vdisk is created on the storage appliance and the application data is stored in the lun inode of the vdisk. Operating system specific information pertaining to the client and relating to storage device (e.g., disk) semantics are stored in the prefix and suffix stream inodes, "outside" of the application data container (lun inode). In another embodiment of the invention, an existing file, such as a VLD or DDAFS file, may be converted (migrated) to a vdisk "in place", i.e., without any copy operations. Migration thus encapsulates the application data of the file within the data container and "between" operating system-specific disk semantic information stored in the prefix and suffix stream inodes. Notably when a file is converted into a vdisk structure, the resulting vdisk retains the property of being accessible (viewable) as a file.

According to the invention, a vdisk may be embodied as a plurality of transgender data containers that enables a "dual" access path to the same application data (i.e., vdisk) stored on the storage appliance. That is, the vdisk can be accessed as a file over NAS based protocols or as a lun (disk) over SAN based protocols. In response to the client accessing the vdisk as a file, the storage operating system "filters" the disk semantics stored in the prefix and suffix stream inodes from the application data stored in the lun inode, thereby returning (to the client) only the application data according to a particular transgender data format. However, in response to the client accessing the vdisk as a lun, the storage operating system returns both the application data stored in the lun inode and any required disk semantics stored in the suffix and prefix stream inodes according to another transgender data format.

Advantageously, the inventive technique utilizes the dual access capability of the vdisk structure to allow application data to be viewed as either a file or lun to clients of NAS and SAN environments via file or block protocols, respectively. Files can be converted into vdisks to allow access to data created in a NAS application through the use block protocols. Security is defined to control NAS access to vdisks, thereby guaranteeing data integrity. Therefore, the vdisk can be accessed as a lun (over block-based protocols), as well as a VLD (over a file-based protocol, such as NFS) and as a file (over a file-based protocol, such as DAFS).

BRIEF DESCRIPTION OF THE DRAWINGS

The above and further advantages of invention may be better understood by referring to the following description in conjunction with the accompanying drawings in which like reference numerals indicate identical or functionally similar elements:

FIG. 8 is a schematic diagram illustrating a table with a plurality of entries, each indicating sizes of prefix and suffix inodes corresponding to a subtype attribute of a vdisk;

DETAILED DESCRIPTION OF ILLUSTRATIVE EMBODIMENTS

Figure 1:
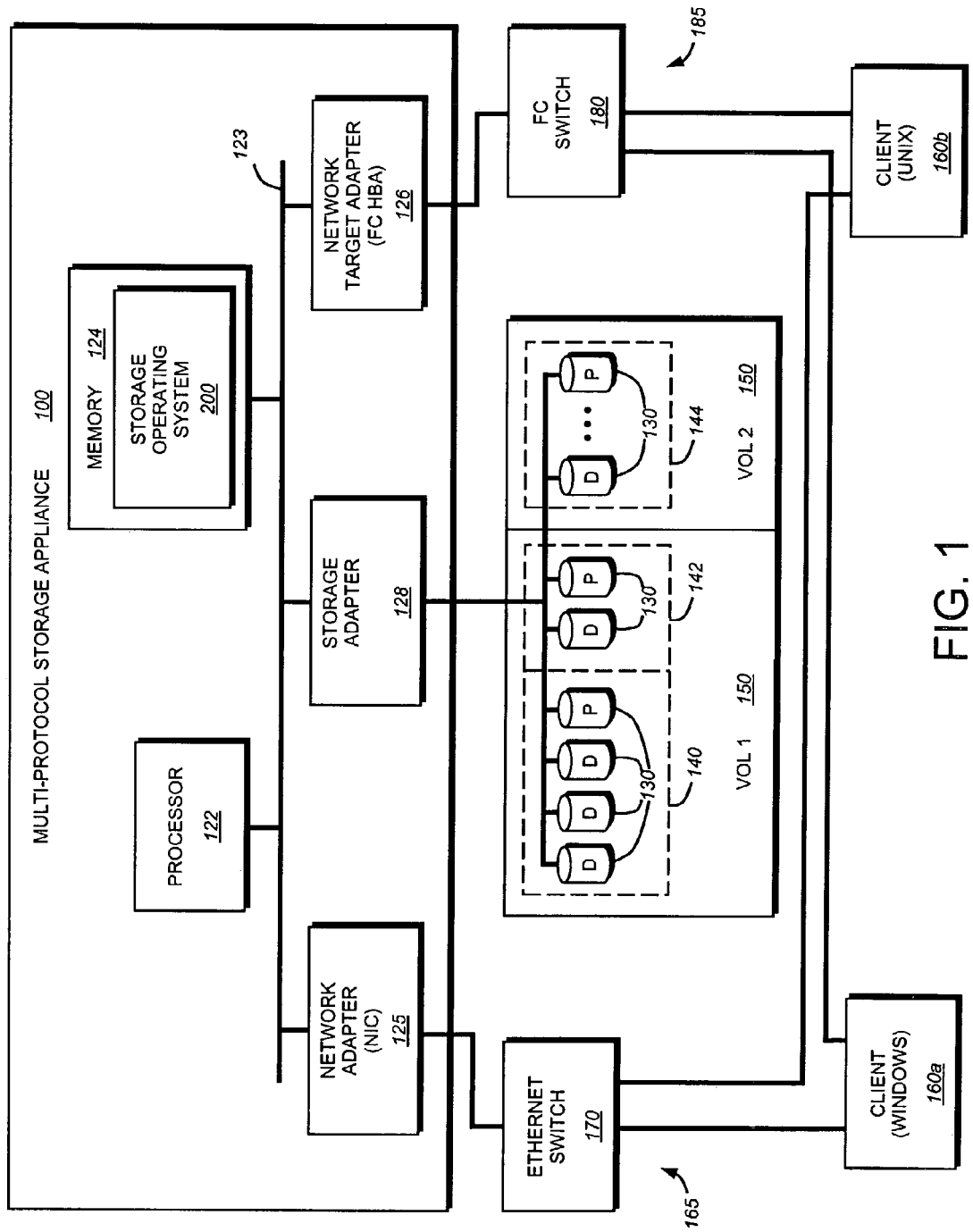
FIG. 1 is a schematic block diagram of a multi-protocol storage appliance that may be advantageously used with the present invention.

FIG. 1 is a schematic block diagram of a multi-protocol storage appliance 100 that may be advantageously used with the present invention. The multi-protocol storage appliance is configured to provide storage service for both file and block protocol access to information stored on storage devices in an integrated manner. In this context, the integrated multi-protocol appliance denotes a computer having features such as simplicity of storage service management and ease of storage reconfiguration, including reusable storage space, for users (system administrators) and clients of network attached storage (NAS) and storage area network (SAN) deployments.

The multi-protocol storage appliance 100 is illustratively embodied as a storage system comprising a processor 122, a memory 124, a plurality of network adapters 125, 126 and a storage adapter 128 interconnected by a system bus 123. The multi-protocol storage appliance 100 also includes a storage operating system 200 that provides a virtualization system (and, in particular, a file system) to logically organize the information as a hierarchical structure of named directory, file and virtual disk (vdisk) storage objects on the disks 130. An example of a multi-protocol storage appliance that may be advantageously used with the present invention is described in co-pending and commonly assigned U.S. patent application Ser. No. 10/215,917 titled Multi-Protocol Storage Appliance that Provides Integrated Support for File and Block Access Protocols, which application is hereby incorporated by reference as though fully set forth herein.

Whereas clients of a NAS-based network environment have a storage viewpoint of files, the clients of a SAN-based network environment have a storage viewpoint of blocks or disks. To that end, the multi-protocol storage appliance 100 presents (exports) disks to SAN clients through the creation of logical unit numbers (luns) or vdisk objects. A vdisk object (hereinafter "vdisk") is a special file type that is implemented by the virtualization system and translated into an emulated disk as viewed by the SAN clients. The multi-protocol storage appliance thereafter makes these emulated disks accessible to the SAN clients through controlled exports.

In the illustrative embodiment, the memory 124 comprises storage locations that are addressable by the processor and adapters for storing software program code and data structures associated with the present invention. The processor and adapters may, in turn, comprise processing elements and/or logic circuitry configured to execute the software is code and manipulate the data structures. The storage operating system 200, portions of which are typically resident in memory and executed by the processing elements, functionally organizes the storage appliance by, inter alia, invoking storage operations in support of the storage service implemented by the appliance. It will be apparent to those skilled in the art that other processing and memory means, including various computer readable media, may be used for storing and executing program instructions pertaining to the invention described herein.

The network adapter 125 couples the storage appliance to a plurality of clients 160a,b over point-to-point links, wide area networks, virtual private networks implemented over a public network (Internet) or a shared local area network, hereinafter referred to as an illustrative Ethernet network 165. For this NAS-based network environment, the clients are configured to access information stored on the multi-protocol appliance as files. Therefore, the network adapter 125 may comprise a network interface card (NIC) having the mechanical, electrical and signaling circuitry needed to connect the appliance to a network switch, such as a conventional Ethernet switch 170. The clients 160 communicate with the storage appliance over network 165 by exchanging discrete frames or packets of data according to pre-defined protocols, such as the Transmission Control Protocol/Internet Protocol (TCP/IP).

The clients 160 may be general-purpose computers configured to execute applications over a variety of operating systems, including the Solaris and Windows operating systems. Client systems generally utilize file-based access protocols when accessing information (in the form of files and directories) over a NAS-based network. Therefore, each client 160 may request the services of the storage appliance 100 by issuing file access protocol messages (in the form of packets) to the appliance over the network 165. For example, a client 160a running the Windows operating system may communicate with the storage appliance 100 using the Common Internet File System (CIFS) protocol over TCP/IP. On the other hand, a client 160b running the Solaris operating system may communicate with the multi-protocol appliance using either the Network File System (NFS) protocol over TCP/IP or the Direct Access File System (DAFS) protocol over a virtual interface (VI) transport in accordance with a remote DMA (RDMA) protocol over TCP/IP. It will be apparent to those skilled in the art that other clients running other types of operating systems may also communicate with the integrated multi-protocol storage appliance using other file access protocols.

The storage network "target" adapter 126 also couples the multi-protocol storage appliance 100 to clients 160 that may be further configured to access the stored information as blocks or disks. For this SAN-based network environment, the storage appliance is coupled to an illustrative Fibre Channel (FC) network 185. FC is a networking standard describing a suite of protocols and media that is primarily found in SAN deployments. The network target adapter 126 may comprise a FC host bus adapter (HBA) having the mechanical, electrical and signaling circuitry needed to connect the appliance 100 to a SAN network switch, such as a conventional FC switch 180. In addition to providing FC access, the FC HBA offloads fiber channel network processing operations for the storage appliance.

The clients 160 generally utilize block-based access protocols, such as the Small Computer Systems Interface (SCSI) protocol, when accessing information (in the form of blocks, disks or vdisks) over a SAN-based network. SCSI is a peripheral input/output (I/O) interface with a standard, device independent protocol that allows different peripheral devices, such as disks 130, to attach to the storage appliance 100. In SCSI terminology, clients 160 operating in a SAN environment are initiators that initiate requests and commands for data. The multi-protocol storage appliance is thus a target configured to respond to the requests issued by the initiators in accordance with a request/response protocol. The initiators and targets have endpoint addresses that, in accordance with the FC protocol, comprise worldwide names (WWN). A WWN is a unique identifier, e.g., a node name or a port name, consisting of an 8-byte number.

The multi-protocol storage appliance 100 supports various SCSI-based protocols used in SAN deployments, including SCSI encapsulated over TCP (iSCSI) and SCSI encapsulated over FC (FCP). The initiators (hereinafter clients 160) may thus request the services of the target (hereinafter storage appliance 100) by issuing iSCSI and FCP messages over the network 185 to access information stored on the disks. It will be apparent to those skilled in the art that the clients may also request the services of the integrated multi-protocol storage appliance using other block access protocols. By supporting a plurality of block access protocols, the multi-protocol storage appliance provides a unified and coherent access solution to vdisks/luns in a heterogeneous SAN environment.

The storage adapter 128 cooperates with the storage operating system 200 executing on the storage appliance to access information requested by the clients. The information may be stored on the disks 130 or other similar media adapted to store information. The storage adapter includes I/O interface circuitry that couples to the disks over an I/O interconnect arrangement, such as a conventional high-performance, FC serial link topology. The information is retrieved by the storage adapter and, if necessary, processed by the processor 122 (or the adapter 128 itself) prior to being forwarded over the system bus 123 to the network adapters 125, 126, where the information is formatted into packets or messages and returned to the clients.

Storage of information on the appliance 100 is preferably implemented as one or more storage volumes (e.g., VOL1-2 150) that comprise a cluster of physical storage disks 130, defining an overall logical arrangement of disk space. The disks within a volume are typically organized as one or more groups of Redundant Array of Independent (or Inexpensive) Disks (RAID). RAID implementations enhance the reliability/integrity of data storage through the writing of data "stripes" across a given number of physical disks in the RAID group, and the appropriate storing of redundant information with respect to the striped data. The redundant information enables recovery of data lost when a storage device fails.

Specifically, each volume 150 is constructed from an array of physical disks 130 that are organized as RAID groups 140, 142, and 144. The physical disks of each RAID group include those disks configured to store striped data (D) and those configured to store parity (P) for the data, in accordance with an illustrative RAID 4 level configuration. However, other RAID level configurations (e.g. RAID 5) are also contemplated. In the illustrative embodiment, a minimum of one parity disk and one data disk may be employed. However, a typical implementation may include three data and one parity disk per RAID group and at least one RAID group per volume.

To facilitate access to the disks 130, the storage operating system 200 implements a write-anywhere file system that cooperates with virtualization modules to provide a function that "virtualizes" the storage space provided by disks 130. The file system logically organizes the information as a hierarchical structure of named directory and file objects (hereinafter "directories" and "files") on the disks. Each "on-disk" file may be implemented as set of disk blocks configured to store information, such as data, whereas the directory may be implemented as a specially formatted file in which names and links to other files and directories are stored. The virtualization system allows the file system to further logically organize information as a hierarchical structure of named vdisks on the disks, thereby providing an integrated NAS and SAN appliance approach to storage by enabling file-based (NAS) access to the files and directories, while further enabling block-based (SAN) access to the vdisks on a file-based storage platform.

In the illustrative embodiment, the storage operating system is preferably the NetApp® Data ONTAP™ operating system available from Network Appliance, Inc., Sunnyvale, Calif. that implements a Write Anywhere File Layout (WAFL™) file system. However, it is expressly contemplated that any appropriate storage operating system, including a write in-place file system, may be enhanced for use in accordance with the inventive principles described herein. As such, where the term "WAFL" is employed, it should be taken broadly to refer to any storage operating system that is otherwise adaptable to the teachings of this invention.

As used herein, the term "storage operating system" generally refers to the computer-executable code operable on a computer that manages data access and may, in the case of a multi-protocol storage appliance, implement data access semantics, such as the Data ONTAP storage operating system, which is implemented as a microkernel. The storage operating system can also be implemented as an application program operating over a general-purpose operating system, such as Solaris or Windows, or as a general-purpose operating system with configurable functionality, which is configured for storage applications as described herein.

In addition, it will be understood to those skilled in the art that the inventive technique described herein may apply to any type of special-purpose (e.g., storage serving appliance) or general-purpose computer, including a standalone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems.

Figure 2:
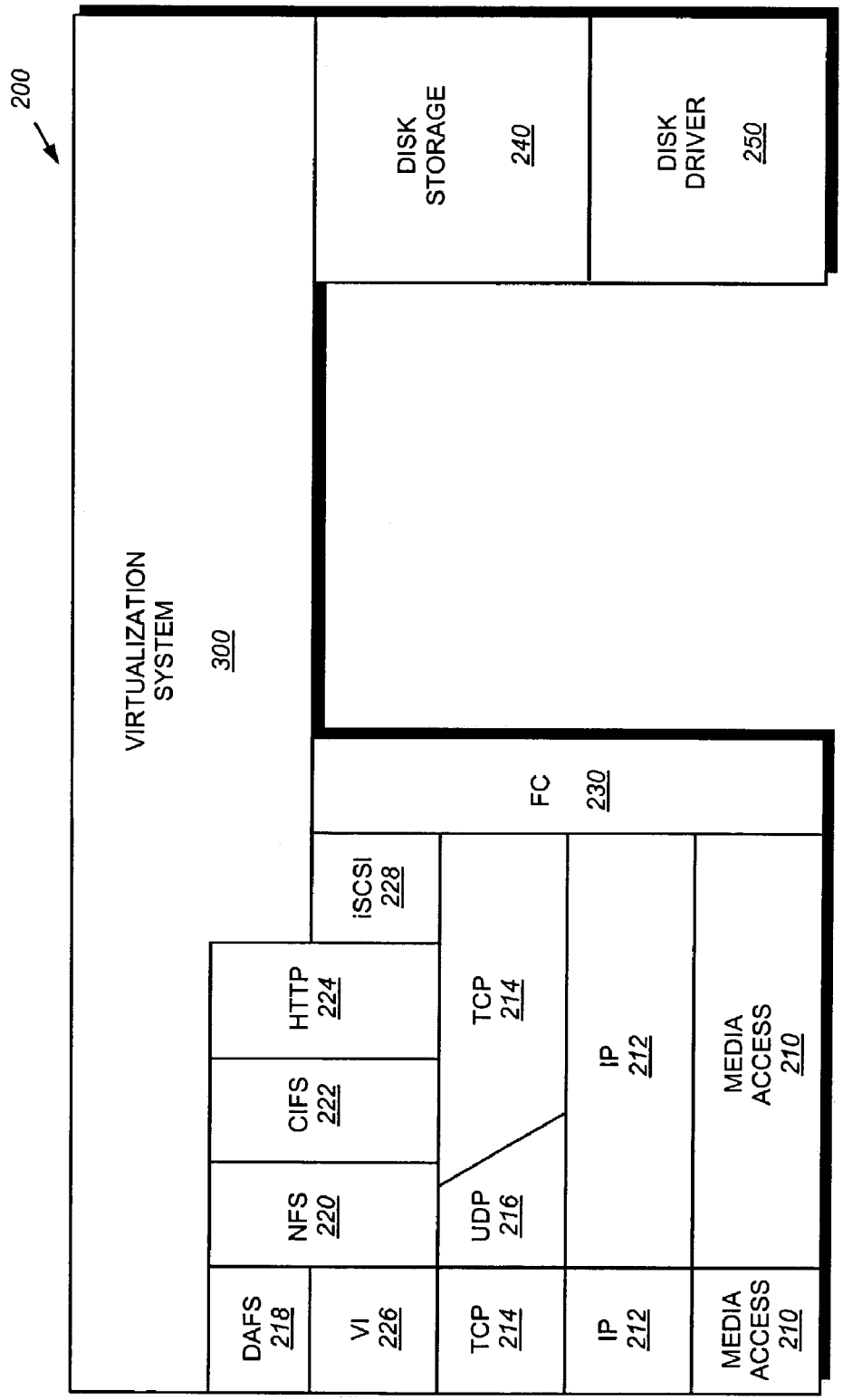
FIG. 2 is a schematic block diagram of a storage operating system of the multi-protocol storage appliance that may be advantageously used with the present invention.

FIG. 2 is a schematic block diagram of the storage operating system 200 that may be advantageously used with the present invention. The storage operating system comprises a series of software layers organized to form an integrated network protocol stack or, more generally, a multi-protocol engine that provides data paths for clients to access information stored on the multi-protocol storage appliance using block and file access protocols. The protocol stack includes a media access layer 210 of network drivers (e.g., gigabit Ethernet drivers) that interfaces to network protocol layers, such as the IP layer 212 and its supporting transport mechanisms, the TCP layer 214 and the User Datagram Protocol (UDP) layer 216. A file system protocol layer provides multi-protocol file access and, to that end, includes support for the DAFS protocol 218, the NFS protocol 220, the CIFS protocol 222 and the Hypertext Transfer Protocol (HTTP) protocol 224. A VI layer 226 implements the VI architecture to provide direct access transport (DAT) capabilities, such as RDMA, as required by the DAFS protocol 218.

An iSCSI driver layer 228 provides block protocol access over the TCP/IP network protocol layers, while a FC driver layer 230 operates with the FC HBA 126 to receive and transmit block access requests and responses to and from the integrated storage appliance. The FC and iSCSI drivers provide FC-specific and iSCSI-specific access control to the luns (vdisks) and, thus, manage exports of vdisks to either iSCSI or FCP or, alternatively, to both iSCSI and FCP when accessing a single vdisk on the multi-protocol storage appliance. In addition, the storage operating system includes a disk storage layer 240 that implements a disk storage protocol, such as a RAID protocol, and a disk driver layer 250 that implements a disk access protocol such as, e.g., a SCSI protocol.

Figure 3:
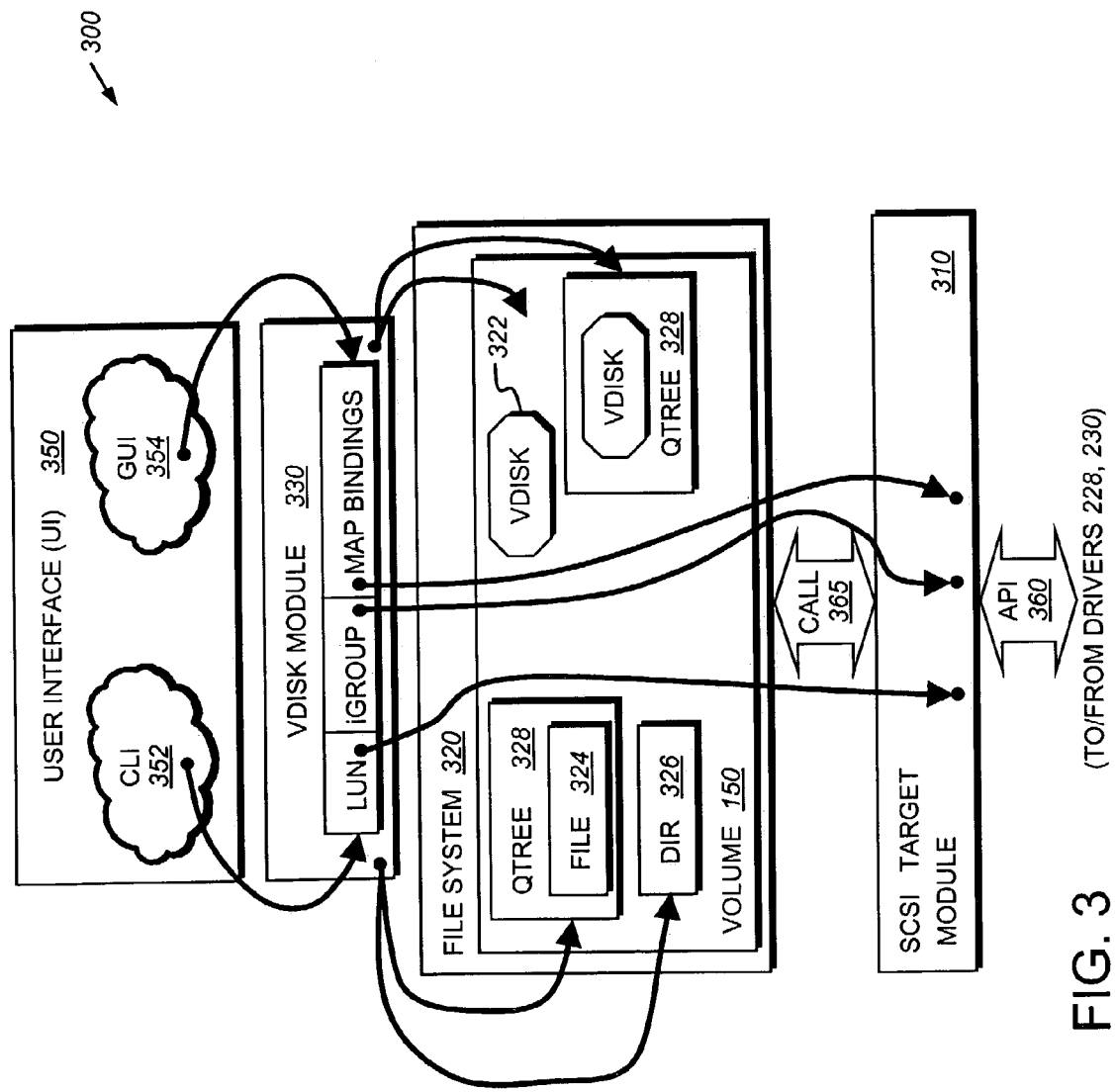
FIG. 3 is a schematic block diagram of a virtualization system that is implemented by a file system interacting with virtualization modules of the storage operating system.

Bridging the disk software layers with the integrated network protocol stack layers is a virtualization system 300. FIG. 3 is a schematic block diagram of the virtualization system 300 that is implemented by a file system 320 interacting with virtualization modules illustratively embodied as, e.g., vdisk module 330 and SCSI target module 310. It should be noted that the vdisk module 330, the file system 320 and SCSI target module 310 can be implemented in software, hardware, firmware, or a combination thereof. The vdisk module 330 is layered on the file system 320 to enable access by administrative interfaces, such as a streamlined user interface (UI 350), in response to a system administrator issuing commands to the multi-protocol storage appliance 100. In essence, the vdisk module 330 manages SAN deployments by, among other things, implementing a comprehensive set of vdisk (lun) commands issued through the UI 350, e.g., a command line interface (CLI 352) or a graphical user interface (GUI 354), by a system administrator. These vdisk commands are converted to primitive file system operations ("primitives") that interact with the file system 320 and the SCSI target module 310 to implement the vdisks.

The SCSI target module 310, in turn, initiates emulation of a disk or lun by providing a mapping procedure that translates luns into the special vdisk file types. The SCSI target module is illustratively disposed between the FC and iSCSI drivers 228, 230 and the file system 320 to thereby provide a translation layer of the virtualization system 300 between the SAN block (lun) space and the file system space, where luns are represented as vdisks 322. To that end, the SCSI target module has a set of application programming interfaces (APIs 360) that are based on the SCSI protocol and that enable a consistent interface to both the iSCSI and FCP drivers 228, 230. By "disposing" SAN virtualization over the file system 320, the multi-protocol storage appliance reverses the approaches taken by prior systems to thereby provide a single unified storage platform for essentially all storage access protocols.

The file system 320 is illustratively a message-based system; as such, the SCSI target module 310 transposes a SCSI request into one or more messages representing an operation(s) directed to the file system. For example, a message generated by the SCSI target module may include a type of operation (e.g., read, write) along with a pathname (e.g., a path descriptor) and a filename (e.g., a special filename) of the vdisk object represented in the file system. Alternatively, the generated message may include an operation type and file handle containing volume/inode information. The SCSI target module 310 passes the message into the file system layer 320 as, e.g., a function call 365, where the operation is performed.

The file system provides volume management capabilities for use in block-based access to the information stored on the storage devices, such as disks. That is, in addition to providing file system semantics, such as naming of storage objects, the file system 320 provides functions normally associated with a volume manager. These functions include (i) aggregation of the disks, (ii) aggregation of storage bandwidth of the disks, and (iii) reliability guarantees, such as mirroring and/or parity (RAID), to thereby present one or more storage objects layered on the file system. A feature of the multi-protocol storage appliance is the simplicity of use associated with these volume management capabilities, particularly when used in SAN deployments.

The file system 320 illustratively implements the WAFL file system having an on-disk format representation that is block-based using, e.g., 4 kilobyte (KB) blocks and using inodes to describe the files 324. The WAFL file system uses files to store metadata describing the layout of its file system; these metadata files include, among others, an inode file. A file handle, i.e., an identifier that includes an inode number, is used to retrieve an inode from disk. A description of the structure of the file system, including on-disk inodes and the inode file, is provided in U.S. Pat. No. 5,819,292, titled Method for Maintaining Consistent States of a File System and for Creating User-Accessible Read-Only Copies of a File System by David Hitz et al., issued Oct. 6, 1998, which patent is hereby incorporated by reference as though fully set forth herein.

Figure 4:
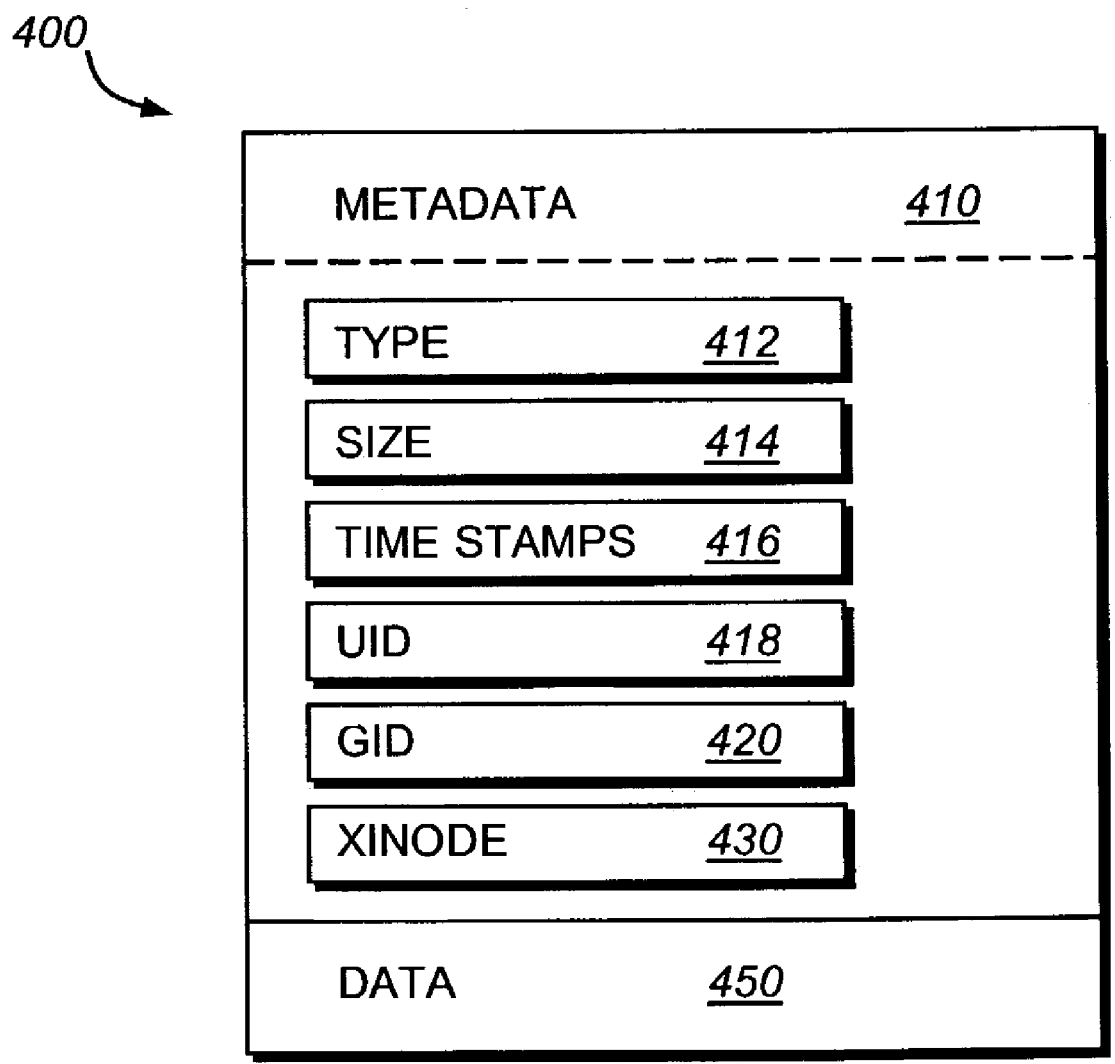
FIG. 4 is a schematic block diagram of an on-disk inode data structure that may be advantageously used with the present invention.

FIG. 4 is a schematic block diagram illustrating an on-disk inode 400, which includes a metadata section 410 and a data section 450. The information stored in the metadata section 410 of each inode 400 describes the file and, as such, includes the type (e.g., regular or directory) 412 of file, the size 414 of the file, time stamps (e.g., access and/or modification) 416 for the file and ownership, i.e., user identifier (UID 418) and group ID (GID 420), of the file. The metadata section 410 further includes a xinode field 430 containing a pointer that references another on-disk inode structure containing, e.g., access control list (ACL) information associated with the file or directory. The contents of the data section 450 of each inode, however, may be interpreted differently depending upon the type of file (inode) defined within the type field 412. For example, the data section 450 of a directory inode contains metadata controlled by the file system, whereas the data section of a regular inode contains user-defined data. In this latter case, the data section 450 includes a representation of the data associated with the file.

Specifically, the data section 450 of a regular on-disk inode may include user data or pointers, the latter referencing 4 KB data blocks on disk used to store the user data. Each pointer is preferably a logical volume block number to thereby facilitate efficiency among the file system and the disk storage (RAID) layer 240 when accessing the data on disks. Given the restricted size (128 bytes) of the inode, user data having a size that is less than or equal to 64 bytes is represented, in its entirety, within the data section of that inode. However, if the user data is greater than 64 bytes but less than or equal to 64 KB, then the data section of the inode comprises up to 16 pointers, each of which references a 4 KB block of data on the disk. Moreover, if the size of the data is greater than 64 kilobytes but less than or equal to 64 megabytes (MB), then each pointer in the data section 450 of the inode references an indirect inode that contains 1024 pointers, each of which references a 4 KB data block on disk. Each data block is loaded from disk 130 into memory 124 in order to access the data. In addition, the size field 414 of the metadata section 410 of the inode refers to the size of the file.

Broadly stated, all inodes of the file system are organized into the inode file. A file system (FS) info block specifies the layout of information in the file system and includes an inode of a file that includes all other inodes of the file system. Each volume has an FS info block that is preferably stored at a fixed location within, e.g., a RAID group of the file system. The inode of the root FS info block may directly reference (point to) blocks of the inode file or may reference indirect blocks of the inode file that, in turn, reference direct blocks of the inode file. Within each direct block of the inode file are embedded inodes, each of which may reference indirect blocks that, in turn, reference data blocks of a file or vdisk.

Referring again to FIG. 3, the file system implements access operations to vdisks 322, as well as to files 324 and directories (dir 326) that coexist with respect to global space management of units of storage, such as volumes 150 and/or qtrees 328. A qtree 328 is a special directory that has the properties of a logical sub-volume within the namespace of a physical volume. Each file system storage object (file, directory or vdisk) is illustratively associated with one qtree, and quotas, security properties and other items can be assigned on a per-qtree basis. The vdisks and files/directories may be layered on top of qtrees 328 that, in turn, are layered on top of volumes 150 as abstracted by the file system "virtualization" layer 320.

Note that the vdisk storage objects in the file system 320 are generally associated with SAN deployments of the multi-protocol storage appliance, whereas the file and directory storage objects are associated with NAS deployments of the appliance. The files and directories are generally not accessible via the FC or SCSI block access protocols; however, according to the present invention, a file can be converted to a vdisk and then accessed by either the SAN or NAS protocol. The vdisks are thus accessible as luns from the SAN (FC and SCSI) protocols and as files by the NAS (NFS and CIFS) protocols.

Specifically, the present invention relates to a technique that enables application data stored on a storage system to be accessible by a client as either a file or lun. To that end, the file system logically organizes the application data as a vdisk which, as noted, is a special file type in a volume that derives from a plain (regular) file, but that has associated export controls and operation restrictions that support emulation of a disk. Illustratively, the vdisk is a multi-inode object comprising a special file inode and a plurality of associated stream inodes, including an attributes stream inode, a prefix stream inode and a suffix stream inode. The special file (lun) inode functions as a data container for storing data, such as application data, associated with the emulated disk. Operating system specific information pertaining to the client and relating to disk semantics are stored in the prefix and suffix stream inodes, "outside" of the application data container. These stream inodes allow the vdisk to be shared over a block-based (SAN) protocol or a file-based (NAS) protocol by enabling apportionment of client operating system dependent storage device (e.g., disk) contents from application data contents of the vdisk.

Figure 5:
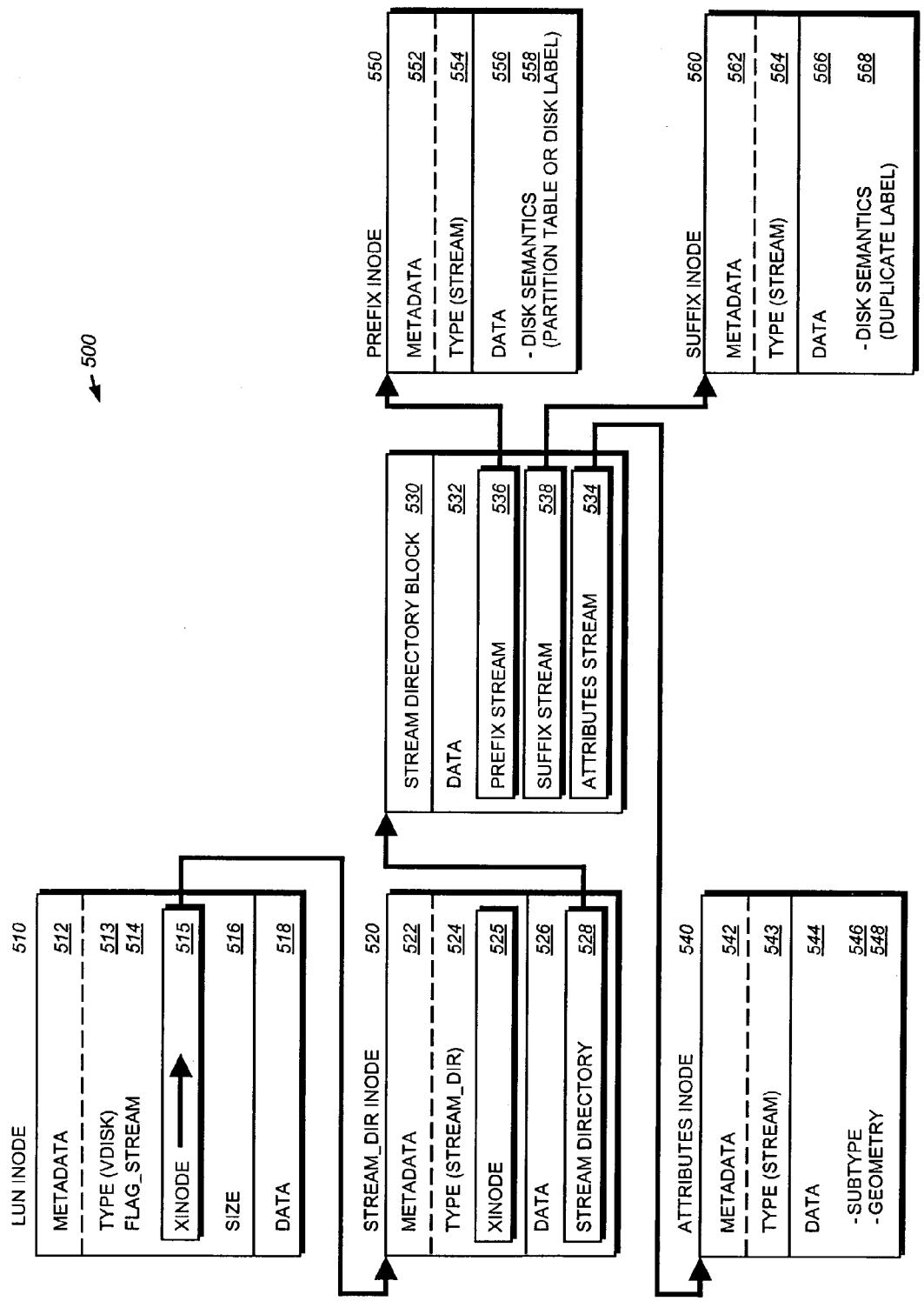
FIG. 5 is a schematic block diagram illustrating an on-disk representation of virtual disk (vdisk) inode data structures, including logical unit number (lun) as well as pre-fix and suffix inodes, in accordance with the present invention.

FIG. 5 is a schematic block diagram illustrating an on-disk representation of vdisk inode data structures 500, including a lun inode 510, an attributes inode 540, a prefix inode 550 and a suffix inode 560. As noted, the lun inode 510 is the special file inode that functions as a data container for storing application data associated with the vdisk 322. That is, the lun inode comprises a data section 518 that may store the actual application data or pointers referencing 4 KB data blocks on disk used to store the data, as described in FIG. 4. The data stored in this "default" data container can be retrieved (read) and stored (written) by a client using conventional block access protocols, such as the SCSI protocol. When appropriately configured, a vdisk may also be accessed using conventional file-level access protocols, such as the NFS protocol. In this configuration, a vdisk "appears" to be a regular file for such accesses. The lun inode 510 also comprises a metadata section 512 containing metadata such as the type 513 (i.e., a special vdisk type) and size 516 of the vdisk that, upon creation of the inode, is zero. A flag_stream flag 514 identifies the lun inode 510 as having not only a default data container section 518 but also one or more stream "sections", as provided by stream_dir inode 520.

In order to access the stream_dir inode 520, the pointer of xinode field 515 in lun inode 510 is modified to reference the inode 520. The stream_dir inode 520 comprises a metadata section 522 that includes a type (stream_dir) field 524 and an xinode field 525 that references another on-disk inode structure containing, e.g., access control (such as CIFS permission) information associated with the vdisk. The inode 520 also includes a data section 526 containing a pointer 528 that references a stream directory data block associated with the vdisk, such as stream directory block 530. The stream directory block 530 comprises a data section 532 that includes a plurality of entries, each containing an external representation of a stream inode along with mapping information (i.e., the inode number) for that inode. One of those entries, entry 534, contains mapping information (e.g., a pointer) that references an attributes (stream) inode 540.

The attributes inode 540 comprises a metadata section 542 that includes a type (stream) field 543 and a data section 544 that functions as a persistent store for holding various named attributes associated with the vdisk 322. Attributes are an implementation mechanism that is internal to the file system and not managed by users. Examples of attributes include a subtype 546 and geometry 548 of a lun inode. The vdisk and its associated inode data structures, including the attributes inode, are further described in co-pending and commonly assigned U.S. patent application Ser. No. 10/216, 453 titled Storage Virtualization by Layering Vdisks on a File System, by Vijayan Raj an, et al., which application is hereby incorporated by reference as though fully set forth herein.

According to an aspect of the invention, the technique described herein enables creation of dual nature data containers that allows access by a client to application data using both file and block-access protocols. The issue of client requirements for specific metadata information to enable block access to a vdisk or lun arises in that a client needs to encapsulate application data with system metadata identifying properties of the lun (for example, partition tables, disk labels and alternate duplicate labels for recovery). The vdisk structure provides a general solution to this problem by factoring the metadata information into prefix and suffix stream inodes of the vdisk, leaving the application data needed for NAS access in the lun (data container) inode for subsequent transparent access. Resizing operations do not affect the ability to access the application data as the vdisk structure and virtualization system address issues in lun geometry simulation.

Specifically, the lun inode 510, which contains the application data comprising, e.g., a file system or database, is "sandwiched" between the prefix and suffix stream inodes. Other entries 536, 538 of the stream directory block 530 contain mapping information (e.g., pointers) that reference the prefix (stream) inode 550 and a suffix (stream) inode 560. Each inode 550, 560 comprises a metadata section 552, 562 that includes a type (stream) field 554, 564 and a data section 556, 566 that functions as a persistent store for holding disk configuration semantics 558, 568, such as, e.g., SCSI geometry information pertaining to partitioning of the disk(s) storing the application data. The disk semantics are operating system specific and, thus, may be organized as either a partition table (for a Windows client) or a disk label (for a Solaris client). The operating system running on the client views the disks as a bucket of bits including the partition table or disk label (stored in the data section 556 of the prefix inode 550) and sometimes a duplicate label (stored in the data section 566 of the suffix inode 560.) For example, the end of disk may have a duplicate label for possible error recovery if it loses the initial label due to disk error.

For purposes of NAS sharing, the lun inode can be a single large, partition containing application data that is "understandable" (readable) over NAS protocols. The prefix and suffix stream inodes 550, 560 are used to enable filtering of the disk configuration information that is unimportant to a NAS client. The remaining information is application data that a NAS client views as a file. The inventive technique thus allows a vdisk to be accessed over a file access protocol, such as NFS, with the NFS client receiving only the application data. That is, the multi-protocol storage appliance does not return (i.e., skips) the disk configuration (partition) information.

Figure 6:
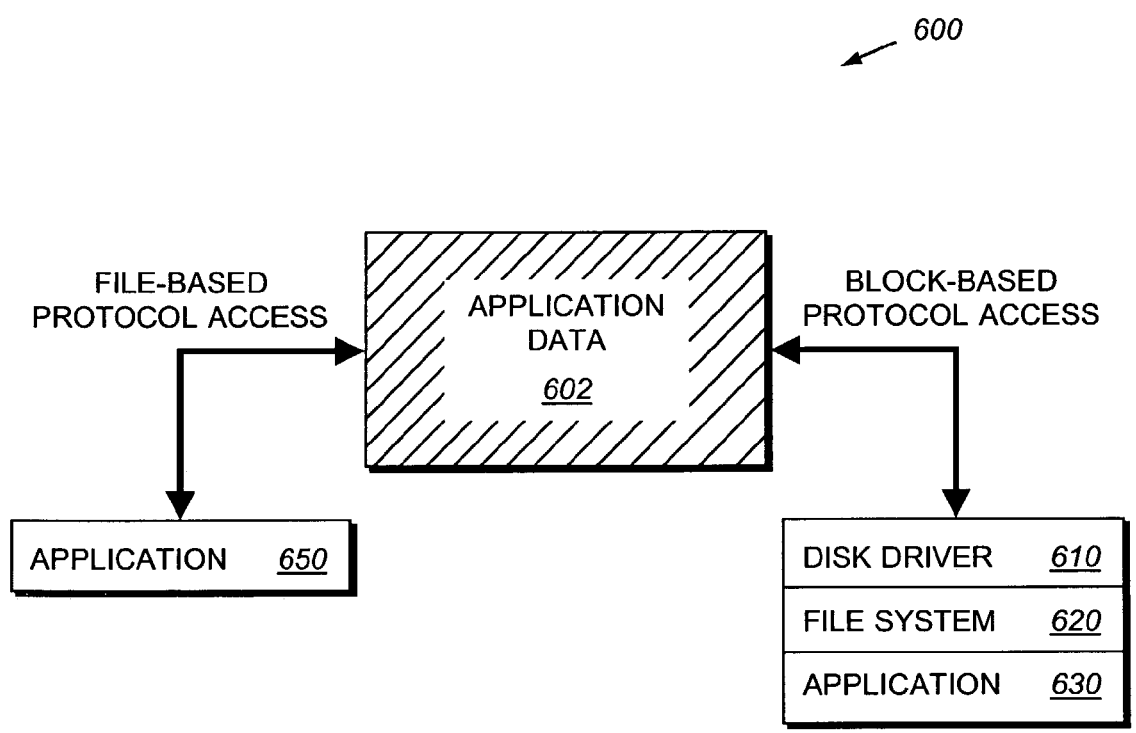
FIG. 6 is a schematic block diagram illustrating various layers of software stacks that interact with various protocol types when accessing a vdisk stored on the multi-protocol storage appliance.

FIG. 6 is a schematic block diagram illustrating various layers of software stacks 600 that interact with various protocol types, e.g., block-based (SAN) protocols and file-based (NAS) protocols, issued by a client when accessing application data of a vdisk stored on a storage system, such as the multi-protocol storage appliance. That is, the data flows through the various layers of the client software stacks 600 in response to an access request. In the case of block-based protocols, these software layers include (i) a disk driver layer 610 (for both Solaris/Windows), (ii) a file system layer 620 (for the VLD) and (iii) an application layer 630. In contrast, the data only flows through the application software layer 650 on the client when accessed by the file-based protocols. Note that when the file-based protocols are used to access a VLD, the "application" in this context, refers to, e.g., a SnapDrive VLD driver.

Figure 7:
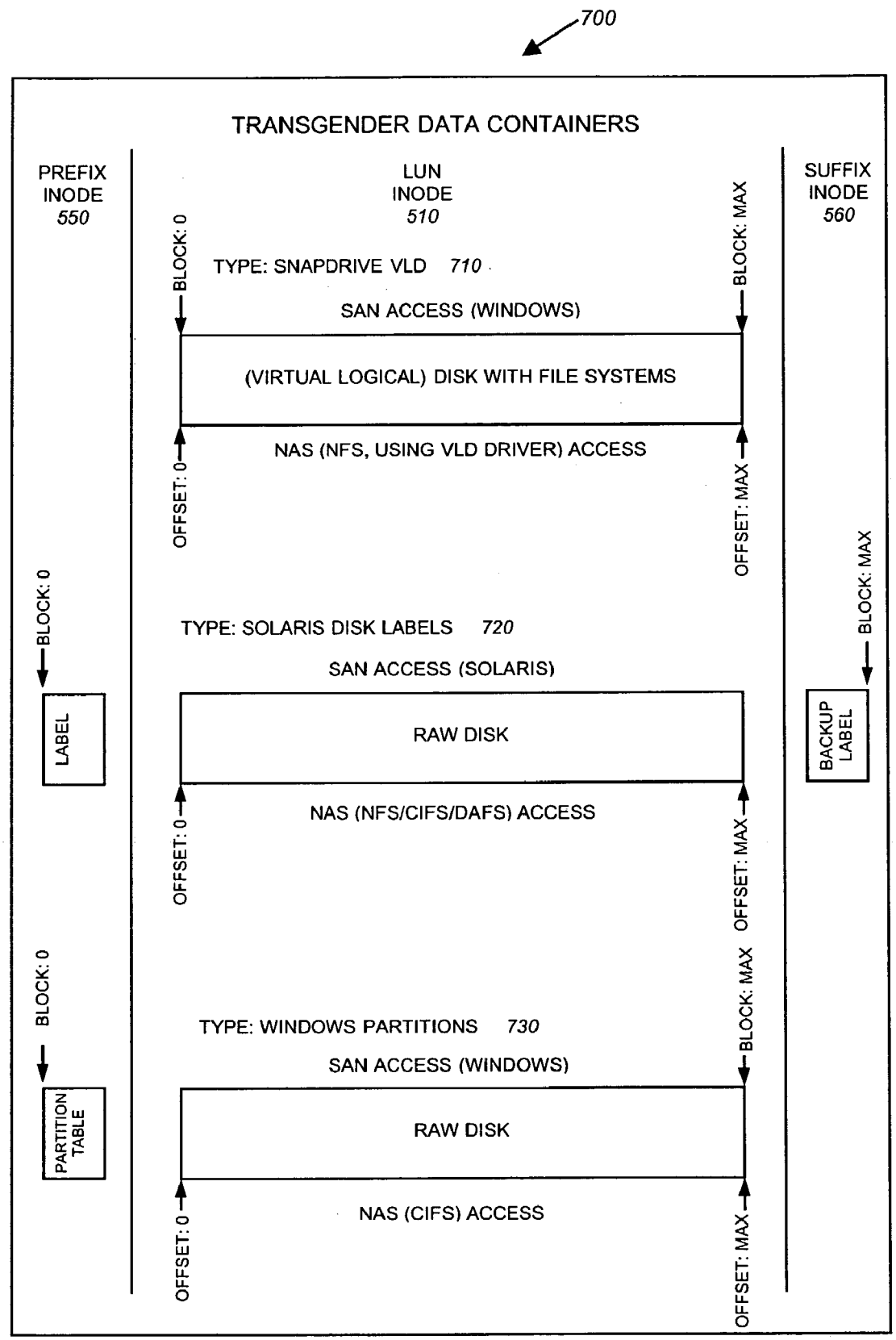
FIG. 7 is a chart illustrating various transgender data container type formats of a vdisk stored on the multi-protocol storage appliance.

FIG. 7 is a chart 700 illustrating various transgender data container type formats of a vdisk stored on the multi-protocol storage appliance. The transgender container types include (1) a SnapDrive VLD, which is an NFS file with an embedded 64 k header that contains information enabling it to be simulated as a disk, (2) an NFS file containing a database and having associated Solaris disk labels, and (3) a CIFS file containing a database and having an associated Windows partition table. An example of a database that may be advantageously used with the data containers is an Oracle database available from Oracle Corporation, Redwood Shores, Calif. The transgender data containers illustrate the formats of information expected by the lowest layer of the software stack 600 residing on a client in response to an access request issued to the storage appliance for both file-based and block-based protocols.

In particular, the transgender data containers illustrate file and block formats of a vdisk that allow access via a NAS protocol (such as NFS) or a SAN protocol (such as iSCSI or FCP). The vertical lines separate the prefix and suffix stream inodes 550, 560 from the lun inode 510, the prefix and suffix stream inodes being used only for block access protocols. Between the vertical lines is the data container (lun inode) that is accessed for the NAS protocols. Broadly stated, each time a vdisk is accessed via a SAN block-based protocol, all information ranging between block: 0 and block: max (i.e., the top horizontal line of each transgender data container type) is returned to the client as blocks. In contrast when the vdisk is accessed over a NAS file-based protocol, the range of information returned to the client is adjusted to offset: 0 and offset: max to thereby "filter out" the disk configuration information stored in the prefix and suffix stream inodes. Notably, these prefix and suffix stream inodes are stored separately to simplify the filtering process.

For example after vdisk conversion, the SnapDrive VLD container type 710 has a 64 k header inserted "in front" of the application data within the lun inode 510 for use by the client site VLD driver. The Snap Drive VLD container type 710 does not utilize a prefix inode 550, unlike the examples described below. The 64 k header is treated as a disk label and returned, along with the application data, to the client, e.g., a Windows client, over a file-based protocol, such as NFS. Therefore when accessed over NFS, the lowest software stack layer (e.g., the SnapDrive driver "application" 650) expects to receive offset: 0 to offset: max. When accessing a SnapDrive VLD container using a SAN access protocol, SAN access is offset 64 KB into the inode to accommodate the header information. On the other hand, when accessed over a block-based protocol (such as FCP or iSCSI), the lowest layer of the software stack (e.g., a Windows driver 610) on the client expects to receive block: 0 to block: max. It can be seen that there is a difference in the format of the same application data that the two different software stacks expect to receive.

Refer now to the Solaris disk label transgender data container type 720. After vdisk conversion, the Solaris transgender container type has a disk label inserted in front of the application data (i.e., in the prefix inode 550) and a backup label appended to the end of that data (i.e., in the suffix inode 560). When accessed by a block-based protocol, the information format that the lowest layer of the software stack (e.g., a Solaris driver 610) on the client, e.g., a Solaris client, expects to receive is block: 0 to block: max. Here, the SAN protocol returns all of the information stored on the vdisk. In general, when a SCSI command request to read block: 0 is received over a block-based protocol, information is retrieved starting from the beginning of the label in the prefix inode and continuing to the end of the backup label in the suffix inode. However for a NAS file-based protocol (such as an NFS, CIFS or DAFS request), the prefix and suffix stream inode contents are filtered such that information is returned to the application layer 650 starting at the application data container (offset: 0) and continuing to the end of the data container (offset: max).

As for the Windows partitions type 730, after vdisk conversion, this transgender data container has a partition table stored into the prefix inode 550. When accessed by a block-based protocol, the information format that the lowest layer of the software stack (e.g., a Windows driver 610) on the Windows client expects to receive is block: 0 to block: max, including the partition table in the prefix stream inode. Yet when accessed by a NAS file-based protocol (such as a CIFS request), the prefix stream inode is filtered and the information is returned to the application layer 650 starting at the application data container (offset: 0) and continuing to the end of the data container (offset: max).

Operationally, a request issued by a client is received at the storage appliance and resolved to a vdisk. When the lun inode of the vdisk is retrieved, pointers are followed to retrieve other stream inodes, including the suffix and prefix inodes. If the request is received over a file based (NAS) protocol, the prefix and suffix stream inodes are used to adjust the offset range of information returned. The prefix and suffix stream inodes contain either a Windows partition table (prefix), or a Solaris disk label (prefix) and backup disk label (suffix). The prefix and suffix stream inodes have fixed sizes depending upon the application for which they are created. The lun inodes are typed when created which, in turn, establishes the correct fixed sizes of the prefix and suffix inodes. These lun inode "subtypes" are stored in the attributes stream inode of a vdisk and enable NAS sharing to access the application data by factoring out the varying, but fixed sized, prefix and suffix stream inodes.

FIG. 8 is a schematic diagram illustrating a table 800 with a plurality of entries, each indicating sizes 804 of the prefix and suffix inodes corresponding to a subtype attribute 802 of a vdisk. For an image (default) lun inode subtype (entry 810), the prefix and suffix sizes are both zero. For a Solaris subtype (entry 820), the prefix size is one cylinder and the suffix size is two cylinders. It should be noted that the cylinder size is algorithmically determined when creating the vdisk and is stored as a cylinder size (geometry 548) attribute in the attributes inode 540 of the vdisk. For a Windows lun inode subtype (entry 830), the prefix size is one track and the suffix size is zero, wherein a track is equivalent to 63 sectors, each sector comprising 512 bytes. For the virtual logical disk (VLD) subtype (entry 840), the prefix size is minus (−) 64 kilobytes, denoting subtraction of the 64 k byte header, and the suffix size is zero. Thus, as noted for a VLD transgender data container type, the 64 k byte header is not needed when the application data is accessed over a block-based protocol; however, that header is needed when accessed over NFS (file-based protocol) for use by the SnapDrive driver on a Windows client.

Figure 9:
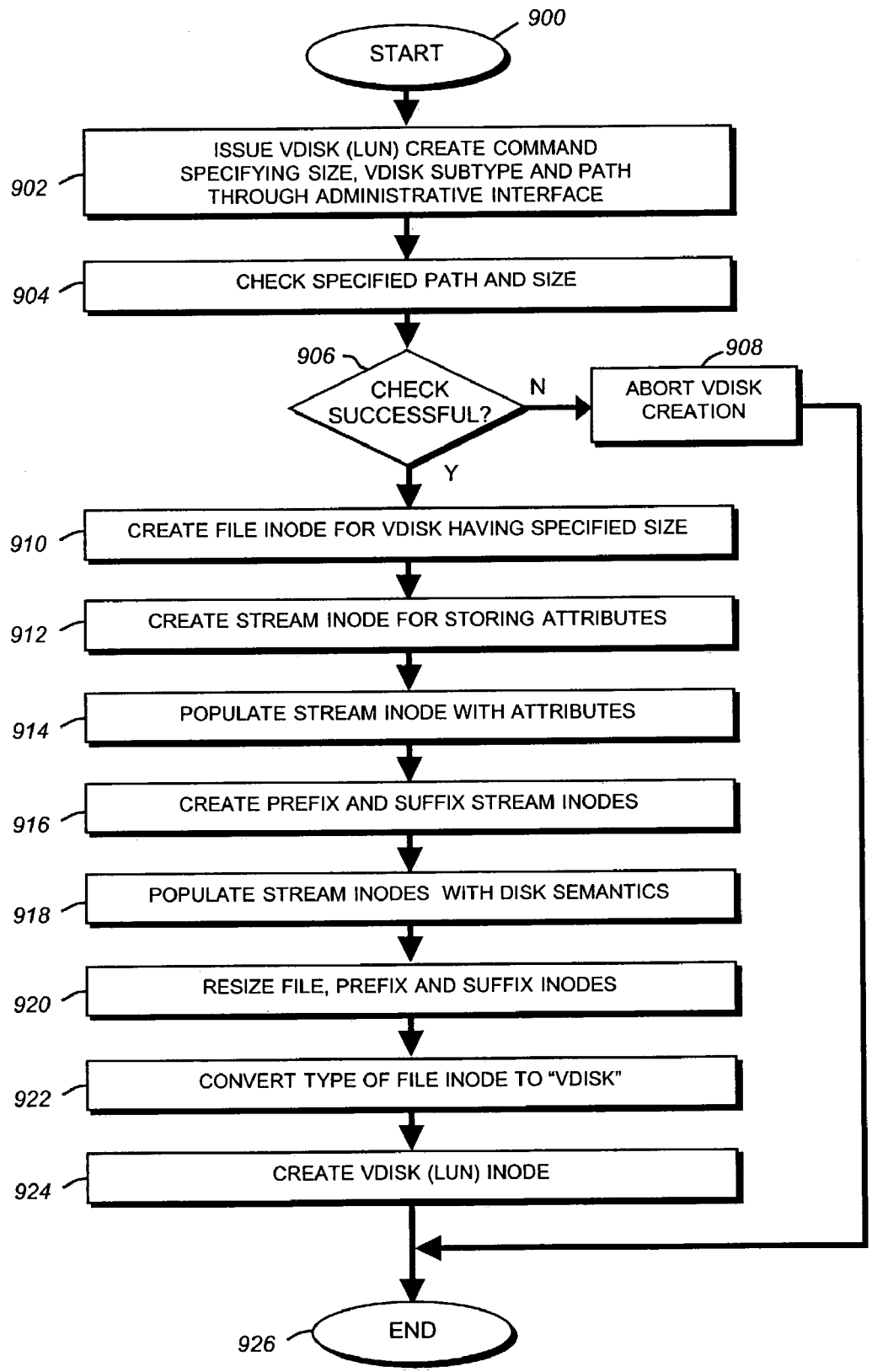
FIG. 9 is a flowchart illustrating a sequence of steps for creating a vdisk of a particular subtype in accordance with a lun creation embodiment according to the present invention.

According to the invention, a lun creation embodiment is provided wherein an original vdisk is created with prefix and suffix inodes on the storage appliance to allow access over file-based protocols, such as NFS, in a Solaris or Windows environment. FIG. 9 is a flowchart illustrating a sequence of steps for creating a vdisk of a particular subtype in accordance with the lun creation embodiment. The sequence starts at Step 900 and proceeds to Step 902 where a user (system administrator) creates a vdisk by issuing a vdisk ("lun create") command through, e.g., CLI 352, GUI 354 or similar administrative interfaces associated with the multi-protocol storage appliance. From the perspective of a user, the lun create command is an atomic operation that specifies creation of a vdisk (lun), along with a desired subtype and size of the vdisk, as well as a path descriptor (full pathname) specifying the location of the vdisk. An example of a command line interpreter (CLI) command that a user (system administrator) may issue to the storage appliance in order to create a vdisk of a particular subtype and particular size is as follows:

lun create -t solaris -s 100 g/vol/vol0/lun0 wherein the -t parameter indicates a vdisk subtype of Solaris and the -s parameter indicates a vdisk size of 100 gigabytes. The path descriptor identifies a volume and directory, e.g., /vol/vol0/lun0, over which the vdisk (identified by a special file name) is layered. In response, the file system 320 cooperates with the vdisk module 330 to "virtualize" the storage space provided by the underlying disks and create a vdisk as specified by the create command. To that end, the vdisk module 330 processes the vdisk command to "call" primitive operations ("primitives") in the file system 320 that implement high-level notions of vdisks (luns).

For example, the vdisk module cooperates with the file system 320 to check the specified path descriptor and size in Step 904. This check operation verifies that (i) the volume specified within the path descriptor exists, (ii) the (special file) name has not been previously allocated in the specified volume, and (iii) there is sufficient storage space for the created vdisk within the specified volume. A determination is then made in Step 906 as to whether the specified path descriptor and size successfully check. If not, vdisk creation is aborted in Step 908 and the sequence ends at Step 926. If the path descriptor and size do check, the file system and the vdisk module cooperate to create a file inode associated with the vdisk and set the specified size for that inode (Step 910). Thus, at Step 910, a regular (plain) file is created in accordance with, e.g., a create file inode (create_file) primitive.

Thereafter, in Step 912, a stream inode is created in accordance with a create stream inode (create_stream) primitive. This stream inode is created for purposes for storing attributes associated with ("bound to") the vdisk to be created. In Step 914, the attributes stream inode is populated with attributes provided by the user. Here, a primitive (stream_write) is executed that stores information in the stream inode. The attributes include, among others, the subtype (Solaris) and geometry of the vdisk. Note that for the Solaris vdisk subtype, the geometry attribute is computed in a manner that enables reporting of a cylinder size to, e.g., a SAN client. Illustratively, the SCSI target module of the storage operating system computes the geometry reported to the SAN client.

In Step 916, additional stream inodes are created as prefix and suffix stream inodes using the create stream inode (create_stream) primitive. In Step 918, the prefix and suffix stream inodes are populated (via the stream_write primitive) with information provided by the user. The information includes metadata, such as the type (e.g., stream) and size of the inode in units (e.g., cylinders or sectors) corresponding to the vdisk subtype, loaded into the metadata section of each inode. In addition, information, such as disk semantics organized as a partition table or (backup) label, is loaded into the data section of the inode. Note that the prefix and suffix information are stored as stream inodes, rather than as separate files, to leverage the encapsulation aspect of a vdisk. The encapsulation aspect enables operations (such as backup) to occur on the vdisk as a single encapsulated storage object.

In Step 920, the regular file inode, as well as the prefix and suffix stream inodes are resized in accordance with resize primitives. Note that the initial sizes of the streams and file are zero. This step of the lun creation sequence instructs the file system to resize those streams and file to a desired size depending upon the specified size of the vdisk (lun) and the subtype of the vdisk. In Step 922, another primitive is executed to convert the type of the file inode from regular to "vdisk", thereby creating the vdisk (lun) inode in Step 924. The sequence then ends in Step 926.

The invention also includes an embodiment whereby existing files on the storage appliance can be migrated (converted) to vdisks. This migration embodiment pertains to a single file conversion to vdisk aspect of the inventive technique. That is, this aspect of the invention pertains to specific applications, such as Oracle database conversion and VLD conversion, in an enterprise environment that are configured to access a single file as a disk or lun. According to the file migration embodiment, the application data is encapsulated "between" the prefix and suffix stream inodes of the vdisk to thereby allow access over block-based protocols, such as FCP or iSCSI.

Figure 10:
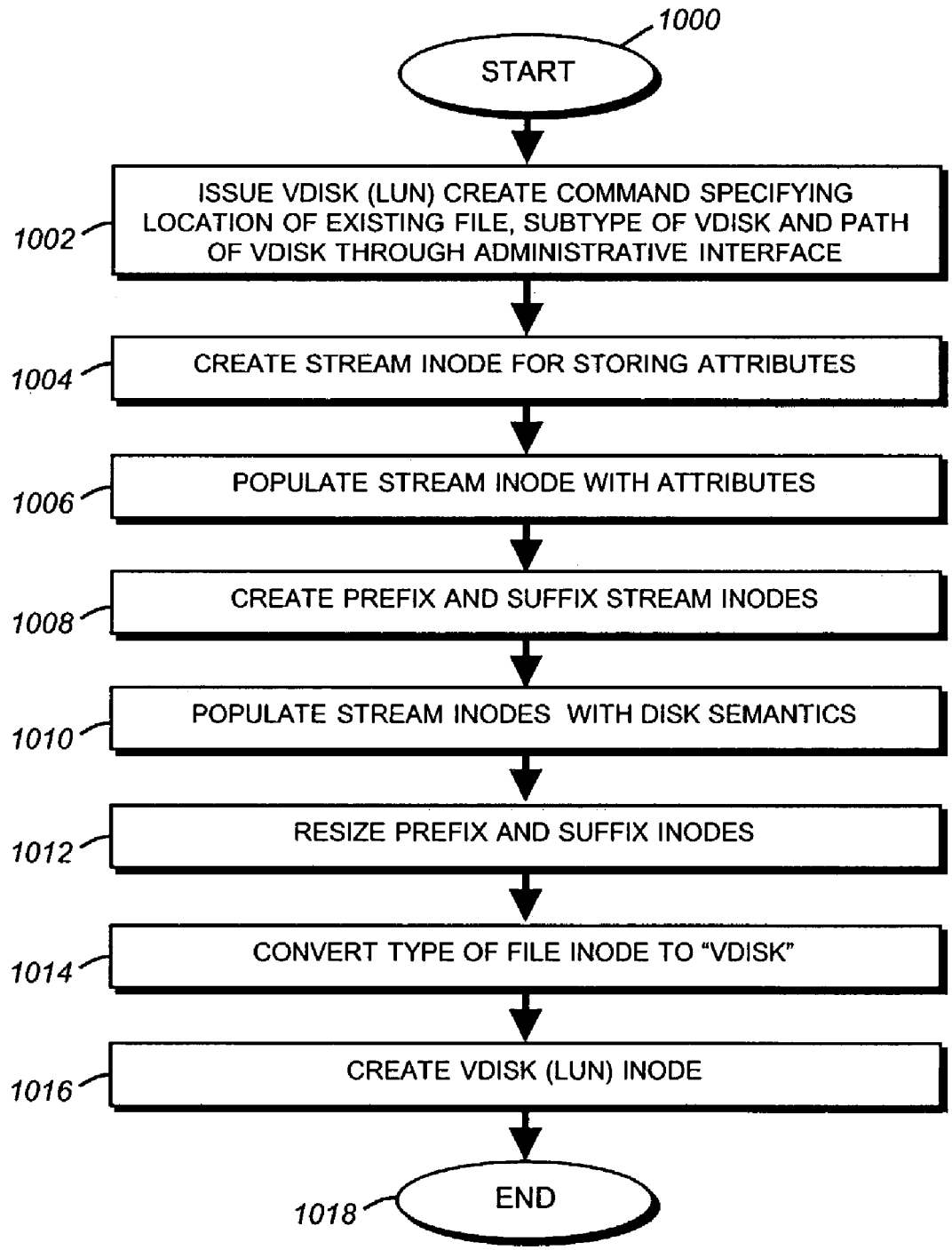
FIG. 10 is a flowchart illustrating a sequence of steps for converting an existing file to a vdisk of a particular subtype in accordance with a file migration embodiment of the present invention.

FIG. 10 is a flowchart illustrating a sequence of steps for converting an existing file to a vdisk of a particular subtype in accordance with the file migration embodiment. The sequence starts at Step 1000 and proceeds to Step 1002 where a user converts an existing file to a vdisk by issuing a lun create command through the administrative interface.

An example of a lun create CLI command that the user may issue to the storage appliance to convert an existing file to a vdisk of a particular subtype is as follows:

lun create -f/vol/vol0/file.0 -t solaris/vol/vol0/lun0 wherein the -f parameter indicates the location of a file inode of the existing file, the -t parameter indicates the subtype of the newly converted vdisk and the pathname indicates the location of that new vdisk.

In Step 1004, an attributes stream inode is created for the converted vdisk and in Step 1006, the attributes stream inode is populated with attributes such as the subtype (Solaris) and geometry of the vdisk. Note that the geometry information is chosen based on the size of the existing file. In Step 1008, prefix and suffix stream inodes are created with, initially, zero contents. In Step 1010, the prefix and suffix stream inodes are populated with information, such as their types (e.g., stream) and sizes in units (e.g., cylinders or sectors) corresponding to their vdisk subtypes, along with their disk semantic tables/labels. In Step 1012, the prefix and suffix stream inodes are resized to a size specified by the subtype of the vdisk. The file size is also adjusted so that the total file size will align properly with the disk geometry. Then, in Step 1014, the type of the file inode is converted from regular to "vdisk" to thereby creating the vdisk (lun) inode in Step 1016. The sequence then ends in Step 1018.

According to the inventive technique, the lun create command described above converts an existing file to a vdisk "in place" by creating a "hard link" from the newly converted vdisk (lun0) to the existing file (file.0) that essentially "names" the new vdisk. A pathname is an entry in a directory that references, e.g., a file inode. The file system 320 allows multiple pathnames for the file inode in multiple directories. Each pathname in each directory is called a "link" to the file inode. Step 1002 thus creates a new (path) name for the converted vdisk from lun0 to file.0. For this example, the new pathname, which determines a "path_last" attribute, is stored in a directory located at /vol/vol0 to thereby facilitate location of the new vdisk. However, it should be noted that other methods may be used to locate a new vdisk, such as converting the existing named file entry of the directory (in place) to a new vdisk entry.

Advantageously, an existing file, such as a VLD or DDAFS file, may be converted (migrated) to a vdisk "in place", i.e., without any copy operations. By eliminating copy operations, issues such as stale data due to divergence of the separate copies, are obviated. Migration thus encapsulates the application data of the file within the data container, while operating system-specific disk semantic information is stored in the pre-fix and suffix stream inodes. Notably when a file is converted into a vdisk structure, the resulting vdisk retains the property of being accessible (viewable) as a file.

Figure 11:
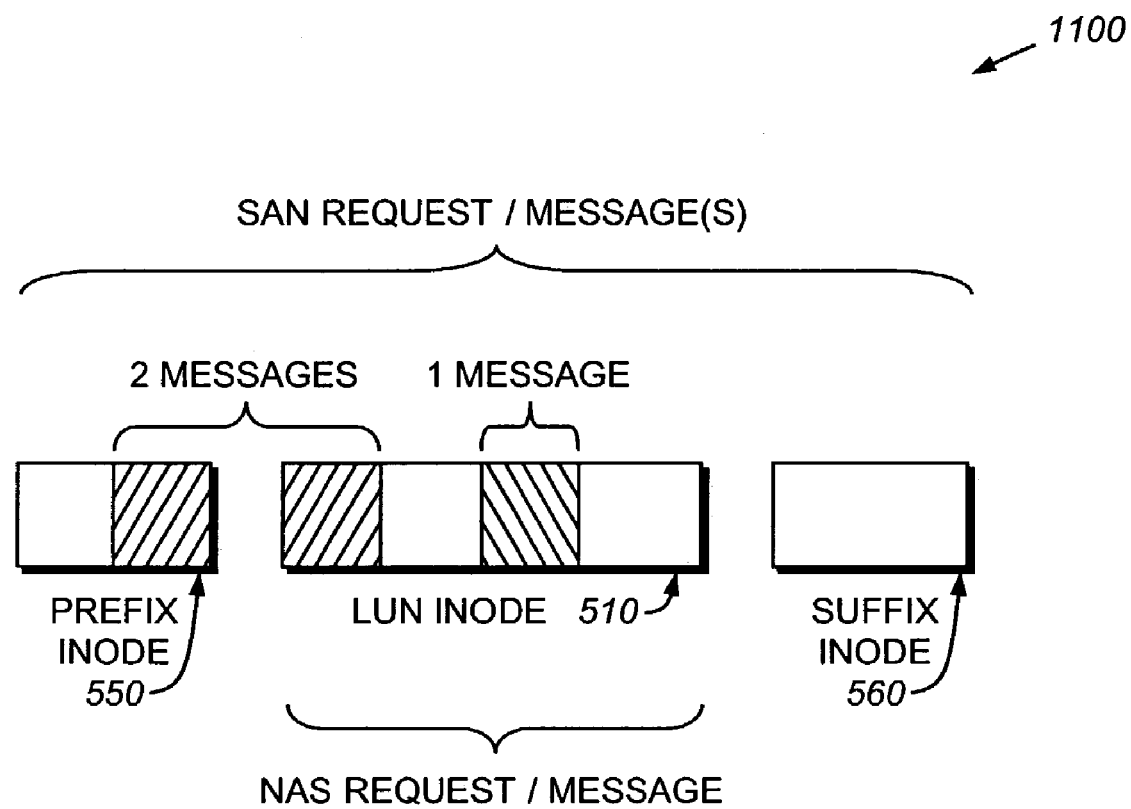
FIG. 11 is a schematic block diagram depicting a segment of information that is accessible as file or lun according to the present invention.

In sum, the present invention enables access to the same application data stored on a vdisk of the multi-protocol storage appliance in accordance with a "dual" access path technique. FIG. 11 is a schematic block diagram depicting a segment 1100 of information, including the application data, contained in a prefix stream inode 550, a lun (data container) inode 510 and a suffix stream inode 560 of the vdisk. According to the inventive technique, a client can access the application data (i.e., vdisk) as a file over NAS based protocols or as a lun (disk) over SAN based protocols. Servicing of a block-based (SAN) request at the storage appliance requires processing of the entire vdisk structure, whereas servicing of a file-based (NAS) request requires processing of only the lun inode (storing the application data). As for the latter (NAS) request, the storage operating system "filters" the disk semantics stored in the prefix and suffix stream inodes from the application data stored in the lun inode when responding to the client request to access the vdisk as a file, thereby returning only the application data to the client according to a transgender data format. However, in response to the client accessing the vdisk as a lun, the storage operating system returns both the application data stored in the lun inode and any required disk semantics stored in the suffix and prefix stream inodes according to another transgender data format.

Specifically, each (read/write) request received at the file and/or block access protocol layers of the storage operating system is resolved to a (special) file, an offset within the file, a length and, for a write request, the write data. The file/block access protocol layer then generates one or more messages that are sent to the file system, where primitives are executed in order to access the appropriate inodes associated with the vdisk. All inodes associated with the vdisk (including the prefix and suffix inodes) are retrieved from disk and loaded in core (memory) prior to manipulation by the file system.

For example in the file-based (NAS) protocol case, a file access layer, e.g., the NFS layer, receives a client request, resolves that request to a file, offset within the file and length, and generates a message that is sent directly to the file system. The file system then processes only the lun inode of the vdisk to essentially filter the disk semantics stored in the prefix (and suffix) inodes of the vdisk. In the block-based (SAN) protocol case, the block access layer, e.g., the SCSI target module, receives the request, resolves it to a file, offset within the file and length, and maps the request into "fresh" messages that are sent to the file system. That is depending upon the request, multiple messages may be generated by the SCSI target module that instruct the file system to, e.g., read (i) the pre-fix stream inode, (ii) the lun inode and (iii) the suffix stream inode, as needed. The request is mapped to the messages based on a logical concatenation of the prefix, base and suffix "view" of the data by the client. Note that the logical concatenation view depends on the "span" of the request.

Assume an initial block-based (SAN) request is directed to data stored in the lun inode of the vdisk. The request is mapped to a single message by the SCSI target module and that message is sent to the file system for processing. On the other hand, assume the initial SAN request is directed to segments of data residing in the prefix stream and lun inodes of the vdisk. The SCSI target module maps this latter request into two (2) messages that are created and sent to the file system. Here, two file system messages are needed because the initial request spans two inodes; i.e., one portion of a request is directed to data residing in the prefix inode and another portion is directed to data residing in the lun inode. Similarly, if the initial block access (SAN) protocol request included a range of blocks that spans the prefix, lun and suffix inodes, then three (3) messages would be generated and issued by the SCSI target module to the file system to access the those inodes.

Advantageously, the inventive technique utilizes the dual access capability of the vdisk structure to allow application data to be viewed (accessed) as either a file or lun to clients of NAS and SAN environments via file or block protocols, respectively. Files can be converted into vdisks to allow access to data created in a NAS application through the use block protocols. Security is defined to control NAS access to vdisks, thereby guaranteeing data integrity. Therefore, the vdisk can be accessed as a lun (over block-based protocols), as well as a VLD (over a file-based protocol, such as NFS) and as a file (over a file-based protocol, such as DAFS).

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A method for enabling application data stored on a disk of a storage system to be accessible by a client as either a file or logical unit number (lun), comprising:
    organizing the application data as a virtual disk (vdisk) comprising a plurality of inodes including a prefix inode, a lun inode and a suffix inode;
    storing the application data in the lun inode;
    storing disk semantics in the prefix and suffix inodes;
    enabling access to the application data in accordance with a dual access path technique by accessing the vdisk as a file over network attached storage (NAS) protocols or as a lun over storage area network (SAN) protocols;
    in response to accessing the vdisk as a file, filtering the disk semantics stored in the prefix and suffix stream inodes from the application data stored in the lun inode; and
    returning only the application data.

2. A method for enabling application data stored on a disk of a storage system to be accessible by a client as either a file or logical unit number (lun), comprising:
    organizing the application data as a virtual disk (vdisk) comprising a plurality of inodes including a prefix inode, a lun inode and a suffix inode;
    storing the application data in the lun inode;
    storing disk semantics in the prefix and suffix inodes;
    enabling access to the application data in accordance with a dual access path technique by accessing the vdisk as a file over network attached storage (NAS) protocols or as a lun over storage area network (SAN) protocols; and
    in response to accessing the vdisk as a lun, returning the application data stored in the lun inode and the disk semantics stored in the suffix and prefix stream inodes.

3. A system configured to enable application data stored on a storage device of a storage system to be accessible as a file or logical unit number (lun), the system comprising:
    a storage operating system adapted to implement a file system that logically organizes the application data as a virtual disk (vdisk), the vdisk embodied as a plurality of transgender data containers that allow access via a network attached storage (NAS) protocol or a storage area network (SAN) protocol, wherein one of the plurality of transgender data containers is a file containing a database and having an associated partition table.

4. The system of claim 3 wherein one of the plurality of transgender data containers is a virtual logical disk (VLD) comprising a file with an embedded header that contains information enabling the file to be simulated as a disk.

5. The system of claim 4 wherein the file is a Network File System (NFS) file.

6. The system of claim 3 wherein the file is a Network File System (NFS) file.

7. The system of claim 3 wherein the file is a Common Internet File System (CIFS) file.

8. A method for enabling application data stored on a disk of a multi-protocol storage appliance to be accessible as a file or as a logical unit number (lun), comprising:
    creating a link from a file inode of the file to a virtual disk (vdisk);
    creating an attributes inode for the vdisk;
    creating prefix and suffix inodes for the vdisk;
    converting a file type of the file inode from regular to vdisk, thereby enabling the vdisk to be accessed as a file or lun; and
    populating the suffix inode with a duplicate label.

9. The method of claim 8 further comprising populating the attributes inode with attributes, such as a subtype of the vdisk.

10. The method of claim 8 further comprising populating the prefix inode with disk semantics, such as one of a partition table, a virtual logical disk header and a label.

* * * * *